W. F. DREIBELBIS.
CHICKEN FEEDER.
APPLICATION FILED APR. 6, 1914.
1,123,501.
Patented Jan. 5, 1915.
2 SHEETS—SHEET 2.
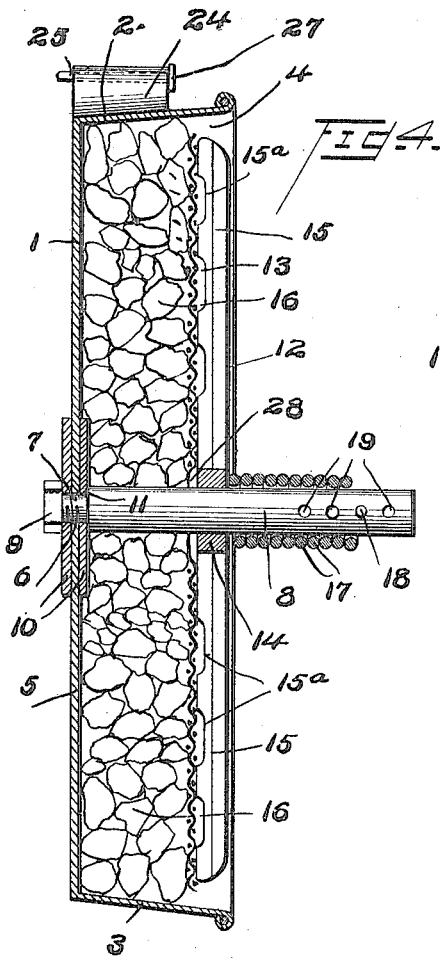
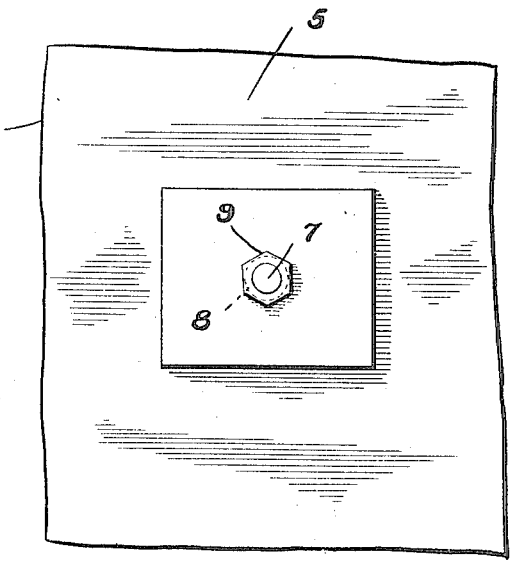
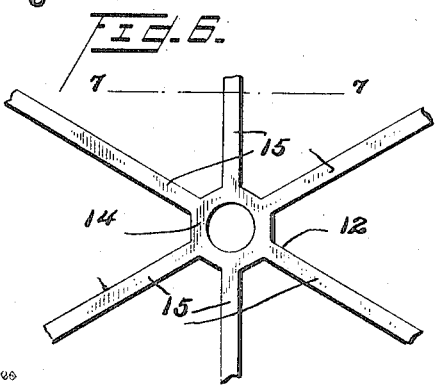
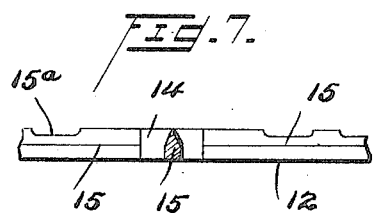
Witnesses
Harold Strauss
C. R. Ziegler.
Inventor
Walter F. Dreibelbis
Joshua R. H. Potts
Attorney

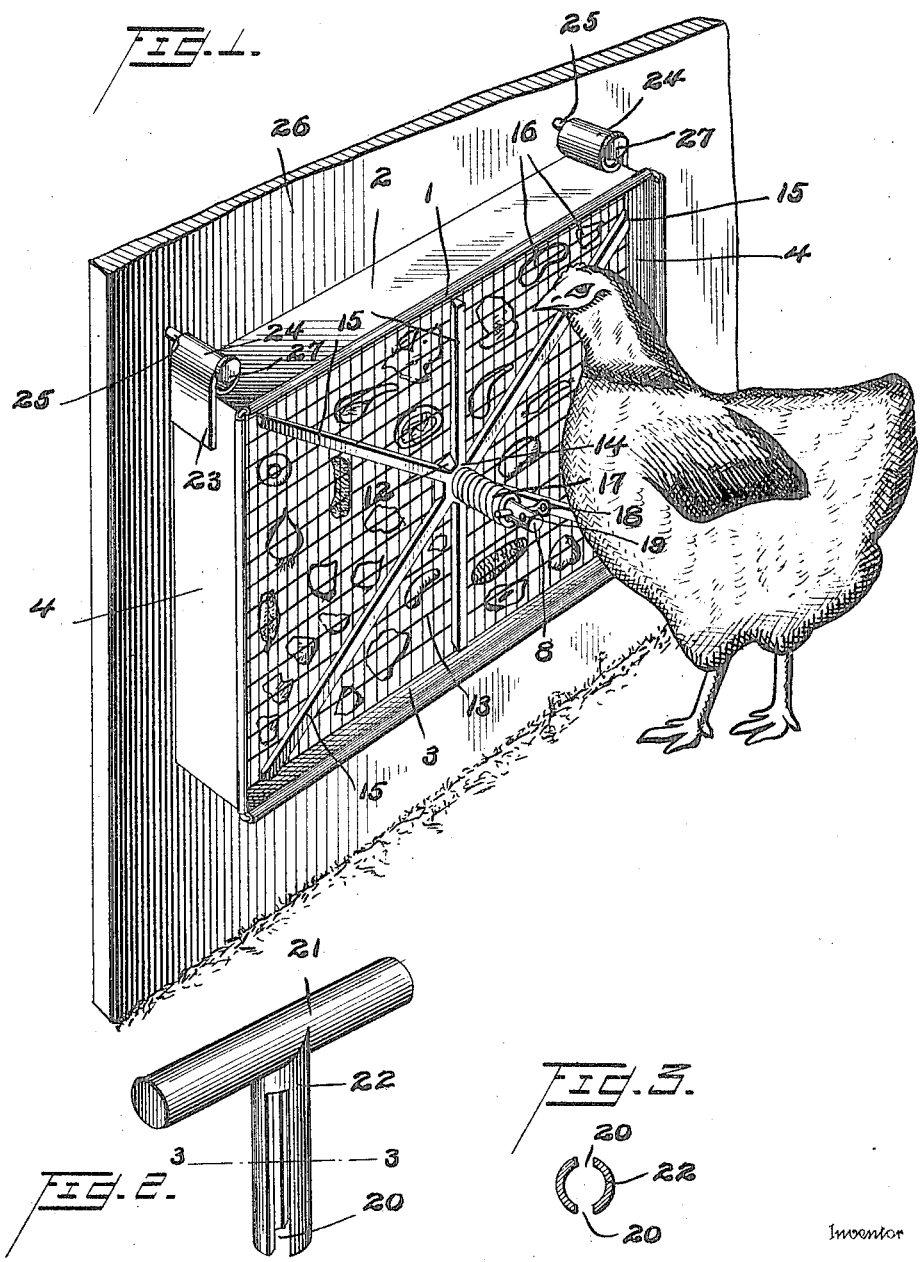

UNITED STATES PATENT OFFICE.

WALTER F. DREIBELBIS, OF ROYERSFORD, PENNSYLVANIA.

CHICKEN-FEEDER.

1,123,501.  Specification of Letters Patent.  Patented Jan. 5, 1915.

Application filed April 6, 1914. Serial No. 829,883.

*To all whom it may concern:*

Be it known that I, WALTER F. DREIBELBIS, a citizen of the United States, residing at Royersford, in the county of Montgomery and State of Pennsylvania, have invented certain new and useful Improvements in Chicken-Feeders, of which the following is a specification.

My invention relates to improvements in chicken feeders, the object of the invention being to provide a device for holding relatively large particles of food and permitting the chickens to feed without dragging the food over the ground.

A further object is to provide a device of this character which is primarily designed for holding left over food from the table such for example as meat, vegetables, ears of sweet corn, lettuce, bread, etc., and supporting such articles of food in such a position as to enable the chickens to remove small particles just sufficient for swallowing, and thereby maintain the food in a clean and sanitary condition until it is entirely consumed.

A further object is to provide a device of this character which is designed to be suspended on a wall or other support above the ground, and which is provided with a screen having a spring-pressed frame over the screen exerting pressure against the food to always hold the screen against the food, and the latter in convenient reach of the chickens.

With these and other objects in view, the invention consists in certain novel features of construction and combinations and arrangements of parts as will be more fully hereinafter described and pointed out in the claims.

In the accompanying drawings: Figure 1 is a perspective view illustrating my improvements. Fig. 2 is a perspective view of a spring compressing tool. Fig. 3 is a view in cross section on the line 3—3 of Fig. 2. Fig. 4 is a view in vertical section through the center of the chicken feeder. Fig. 5 is a fragmentary rear elevation of the same. Fig. 6 is a fragmentary view in elevation of the screen holding frame, and Fig. 7 is a fragmentary view in section on the line 7—7 of Fig. 6.

1 represents a casing preferably, although not essentially, of sheet metal having its upper and lower walls 2 and 3 and its end walls 4 preferably at an angle to its rear wall 5, so that moisture can drain from the receptacle when the latter is inclined in any position. It is, of course, most essential that the bottom 3 should so incline, but for convenience of manufacture, all of the several walls are preferably so inclined.

The rear wall 5, which constitutes the back of the casing, has a central opening 6 for the reception of the reduced end 7 of a post 8. This reduced end 7 is screw-threaded for the reception of a nut 9, and reinforcing plates 10 are located at opposite sides of the rear wall 5 to form a strong and rigid mount for the post 8.

The post 8 is located centrally in the casing, and projects forwardly beyond the casing, and the plates 10, 10 are securely clamped between the nut 9 and a shoulder 11 on the post formed at the juncture of the reduced end 7 with the larger diameter of said post. By reason of this construction the tightening of the nut 9 rigidly fixes the post 8 at right angles to the rear wall 5, and forms a rigid guide for a spider frame 12 as will be hereinafter described.

13 represents a screen which is preferably of wire, and of a mesh large enough to permit the chicken to insert its bill between the mesh and remove particles of food between the screen and the rear wall of the casing. The openings between the wires are of greater height than width, which is desirable to facilitate the removal of food. The screen 13 has a central opening 28 for the post 8, so that it is free to move on the post.

The frame 12 above referred to consists of a center hub portion 14 and a plurality of radial arms 15 projecting therefrom, all consisting of a single integral casting. The hub 14 is movable on the post 8, and the arms 15 bear against the outer face of the screen 13. These arms have their side faces sloping or inclined as shown clearly in Figs. 1 and 7, so that they are thinnest at their inner edge and thickest at their outer edge. The thinnest edges are also recessed as shown at 15ª so as to reduce the contacting surface and to provide additional space to admit the bills of the chickens in removing the food. This shape facilitates the removal of food, because it provides a relatively small contact against the screen and allows the bill of the chicken to be inserted at an angle.

The frame 12 is held against the screen 13, and the latter against the food 16 by means of a coiled spring 17 positioned around a post 8, and at its outer end bearing against a cross pin 18 which is positioned in any of a series of openings 19 in the post 8.

In assembling the parts the food 16 is placed in the casing. The screen 13 is placed against the food, the frame 12 against the screen, and the spring 17 is located around the post 8 with its inner end bearing against the hub portion 14 of frame 12. The spring is then compressed and the pin 18 located in the proper opening in accordance with the quantity of food in the casing. To facilitate this insertion and removal of the pin, I provide a tool such as indicated in Fig. 2, which has a cylindrical barrel 22 slotted at opposite sides as shown at 20, and having at one end a handle 21. This barrel 22 can be positioned over the post 8 with its end bearing against the coiled spring 17, and when pressure is applied, it will compress the spring and the pin 18 can be inserted in the proper opening 19 by projecting the pin through the slots 20 of the barrel 22. To remove the pin, the spring can be compressed in like manner and hence this tool is adapted both for assembling and taking apart the feeder. As the food is removed, the spring will continue to press the frame 12 and the screen 13 rearwardly, so that regardless of the quantity of food in the casing, it will always be held close to the screen by the action of the spring.

To the upper portion of the ends 4 in casing 1, I secure metal straps 23 having their upper ends bent over the top 2 into cylindrical form as shown at 24 to receive nails 25 in a wall or other support 26. These sleeves 24 are of a sufficient diameter to receive the heads 27 of the nails 25, but when the weight of the receptacle is supported by the nails with the sleeves 22 back of the heads 27, the casing cannot be accidentally drawn off the nails by the pull of the chickens as they draw the food through the meshes of the screen.

The feeder can easily be removed by lifting it slightly to register the heads of the nails with the sleeves 24. Furthermore, it will be noted that the sleeves 24 are over the top and do not project beyond the ends of the casing. This is particularly advantageous in packing and shipping as the devices may be placed end to end or may be smoothly wrapped because of this particular arrangement of hanger.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A chicken feeder comprising a casing having a central post, a screen having an opening to receive the post and adapted to be positioned in the casing and confine food between the screen and the rear wall of the casing, a frame having a central opening to receive the post, said frame positioned against the screen, and a spring on the outer end of the post bearing against the frame, substantially as described.

2. A chicken feeder comprising a casing having a central post, a screen having an opening to receive the post and adapted to be positioned in the casing and confine food between the screen and the rear wall of the casing, a frame having a central opening to receive the post, said frame positioned against the screen, said frame having a plurality of radially projecting arms, said arms having their side walls tapering from their outer to their inner edges, and a spring on the outer end of said post bearing against the frame, substantially as described.

3. A chicken feeder comprising a casing having a central post, a screen having an opening to receive the post and adapted to be positioned in the casing and confine food between the screen and the rear wall of the casing, a frame having a central opening to receive the post, said frame positioned against the screen, said post having a plurality of openings in its outer end, a coiled spring located around the post with its inner end bearing against the frame, and a pin inserted through any of the openings in the post and against which the outer end of the spring engages, substantially as described.

4. A chicken feeder comprising a casing having a central post, a screen having an opening to receive the post and adapted to be positioned in the casing and confine food between the screen and the rear wall of the casing, a frame having a central opening to receive the post, said frame positioned against the screen, said frame having a plurality of radially projecting arms, said arms having their side walls tapering from their outer to their inner edges, said post having a plurality of openings in its outer end, a coiled spring located around the post with its inner end bearing against the frame, and a pin inserted through any of the openings in the post and against which the outer end of the spring engages, substantially as described.

5. A chicken feeder comprising a casing having reinforcing plates at its rear walls, said plates and said casing having registering openings, a post having a reduced screw-threaded end projecting through the openings in the plates and the rear wall of the casing, a nut screwed onto the threaded end of the post and clamping the post to the rear wall of the casing, a screen movable on the post, a frame movable on the post, and a spring on the outer end of the post exerting inward pressure on the frame and the screen, substantially as described.

6. A chicken feeder comprising a casing having reinforcing plates at its rear walls, said plates and said casing having registering openings, a post having a reduced screw-threaded end projecting through the openings in the plates and the rear wall of the casing, a nut screwed onto the threaded end of the post and clamping the post to the rear wall of the casing, a screen movable on the post, a frame movable on the post, and a spring on the outer end of the post exerting inward pressure on the frame and the screen, and hangers secured to the end portions of the casing and having nail receiving sleeves at their upper ends positioned over the top of the casing, substantially as described.

7. A chicken feeder comprising a casing having a central post, a screen having an opening to receive the post and adapted to be positioned in the casing and confine food between the screen and the rear wall of the casing, a frame having a central opening to receive the post, said frame positioned against the screen, said frame having a plurality of radially projecting arms, said arms having their side walls tapering from their outer to their inner edges, said arms having recesses in their inner edges, and a spring on the outer end of said post bearing against the frame, substantially as described.

In testimony whereof I have signed my name to this specification in the presence of two subscribing witnesses.

WALTER F. DREIBELBIS.

Witnesses:
C. A. LAUNER,
H. E. ANDERSON.